United States Patent Office 3,851,020
Patented Nov. 26, 1974

3,851,020
BIS(HALOALKYL)METHOXYMETHANE
PHOSPHONATES
Daniel Balde, Levallois Perret, and Georges Nagy, Montrouge, France, assignors to Produits Chimiques Ugine Kuhlmann, Paris, France
No Drawing. Filed July 7, 1972, Ser. No. 269,620
Claims priority, application France, July 15, 1971, 7125823
Int. Cl. C07f 9/40
U.S. Cl. 260—950                                      4 Claims

ABSTRACT OF THE DISCLOSURE

This invention relates to esters of methoxymethanephosphonic acid of the general formula

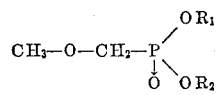

wherein $R_1$ and $R_2$ each is an alkyl radical containing 2, 3 or 4 carbon atoms substituted at position 2 with at least one atom of bromine or chlorine.

The esters of methoxymethanephosphonic acid of this invention can be used as ignifugation agents and are useful for phytopharmaceutical applications and as intermediates.

BACKGROUND OF THE INVENTION

I. Field of the Invention

This invention relates to esters of methoxymethanephosphonic acid.

II. Description of the Prior Art

The compounds of the invention herein can be prepared by a number of well known and conventional reactios. For example, chloromethylmethylether can be condensed with an alkaline metal salt of the corresponding secondary phosphite according to the Michaelis-Becker reaction.

SUMMARY OF THE INVENTION

This invention relates to esters of methoxymethanephosphonic acid of the general formula

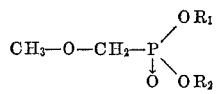

wherein $R_1$ and $R_2$ each is an alkyl radical containing 2, 3 or 4 carbon atoms substituted at position 2 with at least one atom of bromine or chlorine.

The esters of methoxymethanephosphonic acid of this invention can be used as ignifugation agents and are useful for phytopharmaceutical applications and as intermediates.

The most interesting method for preparing the above compounds comprises reacting chloromethylmethylether with a trialkyl phosphite according to the Michaelis-Arbuzov reaction.

This reaction is thought to proceed overall as follows:

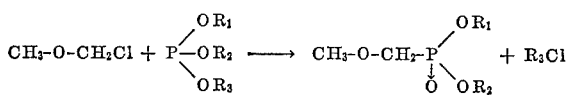

wherein $R_3$, the same or different from $R_1$ and $R_2$, is an alkyl radical of 2, 3 or 4 carbon atoms substituted at position 2 with a bromine or chlorine atom. $R_1$ and $R_2$ each have the above-defined meaning.

DESCRIPTION OF THE PREFERRED EMBODIMENTS

The trialkyl phosphites which are useful for preparing the compounds of this invention are obtained by the addition of 1,2-alkylene oxides to a phosphorus trihalide such as phosphorus trichloride, phosphorus tribromide or a mixture of phosphorus trihalides. If a single alkylene oxide is reacted with the phosphorus derivative, phosphites possessing the identical alkyl radical are obtained. If a mixture of different alkylene oxides are reacted, the mixed end-products are obtained wherein $R_1$, $R_2$ and $R_3$ are different according to the combinations which are possible. In this case, it is advantageous to add the different alkylene oxides, one after the other, in order to obtain better defined end-products.

The following examples are illustrative of the preparation of esters of methoxymethanephosphonic acid according to this invention.

Example 1

269.5 gm. of tris (2-chloroethyl) phosphite (1 mole) prepared by the addition of 132 gm. of ethylene oxide (3 moles) to 137.5 gm. of phosphorus trichloride (1 mole) were placed in a flask. The temperature was increased to 95°–100° C. and 85 gm. of chloromethylmethylether (1.05 moles) were added to the flask over a period of thirty minutes. After the addition of the ether, the heating of the reaction medium was continued for about 5 hours. The 1,2-dichloroethane which formed was distilled and 250 gm. of crude bis(2-chloroethyl)methoxymethanephosphonate having the formula

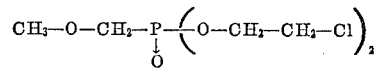

were recovered.

This crude product which contained about 10% of the rearrangement product of the phosphite, bis(2-chloroethyl)-2-chloroethylphosphonate, could be used as such for certain applications. The crude product was, however, subjected to distillation under reduced pressure (130° C./ 0.2 mm. Hg) to provide a yield of 85% by comparison to the starting phosphite, of a product having the following elemental composition:

C, 28.6% (theoretical amount 28.7%)
H, 5.1% (theoretical amount 5.2%)
O, 25.3% (theoretical amount 25.5%)
P, 12.2% (theoretical amount 12.35%)
Cl, 28.8% (theoretical amount 28.3%)

Analysis by nuclear magnetic resonance showed the product to be substantially pure bis(2-chloroethyl) methoxymethanephosphonate having an index of refraction $$n\frac{25}{D} = 1.4678 \text{ and a density } d\frac{20}{20} = 1.3484.$$

Example 2

311.5 gm. of tris(2-chloroisopropyl) phosphite (1 mole) prepared by the addition of 174 gm. of propylene oxide (3 moles) to 137.5 gm. of phosphorus trichloride (1 mole) were placed in a flask. The temperature was increased to 100° C. and 85 gm. chloromethylmethylether (1.05 moles) were added to the flask over a period of 1½ hours. After the addition of the ether, the temperature was maintained at 100° C. for about six hours and thereafter, 110 gm. of 1,2-dichloropropane which formed was recovered by distillation.

275 gm. of crude bis(2-chloroisopropyl) methoxymethanephosphonate having the formula

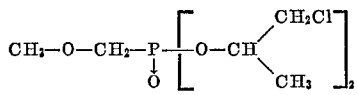

containing about 10% of the rearrangement product of the phosphite, bis(2-chloroisopropyl) 2-chloroisopropylphosphonate, were recovered, The crude product was subjected to distillation under reduced pressure (130° C./0.2 mm. Hg) providing a yield of about 90% by comparison to the starting phosphite, of a product having the following elemental composition:

C, 34.1% (theoretical amount 34.4%)
H, 6.1% (theoretical amount 6.1%)
O, 22.8% (theoretical amount 23.0)
P, 11.0% (theoretical amount 11.1%)
Cl, 26.0% (theoretical amount 25.4%)

Analysis by nuclear magnetic resonance showed the product to be substantially pure bis(2-chloroisopropyl) methoxymethanephosphonate having an index of refraction of $$n\frac{25}{D}=1.4608 \text{ and a density } d\frac{20}{20}=1.2547.$$

Example 3

415 gm. of tris(1,3-dichloroisopropyl) phosphite (1 mole) were placed in a flask. The temperature was increased to 100° C. and 85 gm. of chloromethylmethylether (1.05 moles) were added to the flask over a period of 1 hour. After the addition of reactant, the temperature was maintained at 100° C. for seven hours followed by vacuum distillation of 145 gm. 1,2,3-trichloropropane.

344 gm. of crude bis(1,3-dichloroisopropyl) methoxymethanephosphonate having the formula

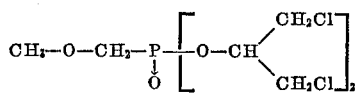

containing approximately 15% of the rearrangement product of the phosphite, bis(1,3-dichloroisopropyl) 1,3-dichloroisopropylphosphonate, were recovered.

Following distillation under reduced pressure (150° C./0.5 mm. Hg), a product was recovered at a yield of about 80% of the starting phosphite having the following elemental composition:

C, 27.5% (theoretical amount 27.6%)
H, 4.25% (theoretical amount 4.3%)
O, 18.2% (theoretical amount 18.4%)
P, 8.85% (theoretical amount 8.9%)
Cl, 41.2% (theoretical amount 40.8%)

Analysis by nuclear magnetic resonance showed the product to be substantially pure bis(1,3-dichloroisopropyl) methoxymethanephosphonate with a refractive index $$n\frac{25}{D}=1.4910 \text{ and a density } d\frac{20}{20}=1.4321.$$

Example 4

137.5 gm. of phosphorus trichloride (1 mole) were placed in a flask and thereafter, under cooling, 90 gm. of propylene oxide (1.55 mole) and 66 gm. of ethylene oxide (1.5 mole) were successively added. In this manner a mixed 2-chloroethyl- and 2-chloroisopropylphosphite of the formula

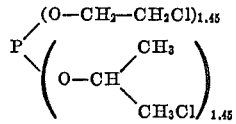

was obtained.

85 gm. of chloromethylmethylether (1.05 moles) were added to the phosphite over a period of 1 hour under agitation and at a temperature of 85–95° C. under nitrogen gas.

At the conclusion of this addition of reactant, the temperature was maintained at 95° C. for six hours after which there was practically no unreacted phosphite remaining. The reaction medium was subjected to distillation resulting in 73 gm. of 1,2-dichloroethane (0.74 moles) and 30 gm. of 1,2-dichloropropane (0.26 moles) which were formed.

In this manner a crude mixed 2-chloroethyl- and 2-chloroisopropylmethoxymethanephosphonate of the formula

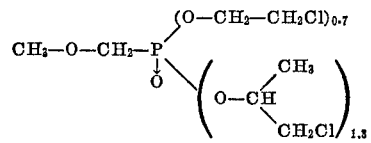

containing only minor amounts of the corresponding rearrangement products (mixture of mixed 2-chloroethyl 2-chloroisopropyl 2-chloroethylphosphonate and 2-chloroethyl 2-chloroisopropyl 2-chloroisopropylphosphonate) were recovered.

Following distillation under reduced pressure, a product of 93% yield by comparison to the amount of starting phosphite having the following elemental analysis was recovered:

C, 34.4%
H, 6.3%
O, 18.9%
P, 12.1%
Cl, 28.3%

Analysis by nuclear magnetic resonance showed that the product was a mixed methoxymethanephosphonate ester of the formula

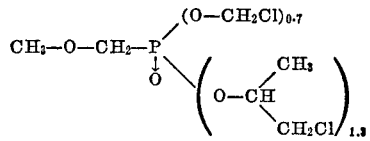

with a refractive index $$n\frac{25}{D}=1.463 \text{ and a density } d\frac{20}{20}=1.287.$$

We claim:
1. Esters of methoxymethanephosphonic acid of the general formula

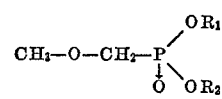

wherein $R_1$ and $R_2$ each is an alkyl radical containing 2, 3 or 4 carbon atoms substituted at position 2 with at least one atom of bromine or chlorine.

2. A compound according to claim 1 of the formula

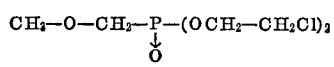

bis(2-chloroethyl)methoxymethanephosphonate.

3. A compound according to claim 1 of the formula

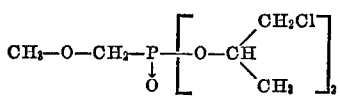

bis(2-chloroisopropyl)methoxymethanephosphonate.

4. A compound according to claim 1 of the formula
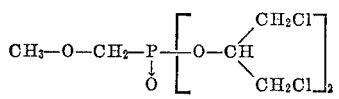
bis(1,3-dichloroisopropyl)methoxymethanephosphonate.
References Cited
UNITED STATES PATENTS
2,934,507    4/1960    Chadwick et al. ____ 260—950 X
ANTON H. SUTTO, Primary Examiner
U.S. Cl. X.R.
252—8.1